US011961421B2

(12) United States Patent
Sakurai

(10) Patent No.: US 11,961,421 B2
(45) Date of Patent: Apr. 16, 2024

(54) DISPLAY MEDIUM, PROCESSING DEVICE, AND PROCESSING PROGRAM

(71) Applicant: DWANGO Co., Ltd., Tokyo (JP)

(72) Inventor: Kaisei Sakurai, Tokyo (JP)

(73) Assignee: DWANGO Co., Ltd., Tokyo (JP)

(*) Notice: Subject to any disclaimer, the term of this patent is extended or adjusted under 35 U.S.C. 154(b) by 0 days.

(21) Appl. No.: 17/761,742

(22) PCT Filed: Nov. 26, 2020

(86) PCT No.: PCT/JP2020/043920

§ 371 (c)(1),
(2) Date: Mar. 18, 2022

(87) PCT Pub. No.: WO2021/106972

PCT Pub. Date: Jun. 3, 2021

(65) Prior Publication Data

US 2022/0351651 A1 Nov. 3, 2022

(30) Foreign Application Priority Data

Nov. 29, 2019 (JP) ................................ 2019-216794

(51) Int. Cl.
*G09F 19/14* (2006.01)
*G09F 9/302* (2006.01)
*G09G 3/20* (2006.01)

(52) U.S. Cl.
CPC .............. *G09F 19/14* (2013.01); *G09F 9/302* (2013.01); *G09G 3/2003* (2013.01); *G09G 2300/0439* (2013.01)

(58) Field of Classification Search
CPC ............ G09G 2300/043; G09G 3/2003; G09F 19/14; G09F 9/302
See application file for complete search history.

(56) References Cited

U.S. PATENT DOCUMENTS 8,800,183 B1 8/2014 Belisle
10,895,672 B2 * 1/2021 Kagotani ............ G02B 5/1876
(Continued)

FOREIGN PATENT DOCUMENTS

CN 101329828 A 12/2008
CN 101331429 A 12/2008
(Continued)

OTHER PUBLICATIONS

International Search Report dated Jan. 19, 2021 in corresponding application No. PCT/JP2020/043920; 5 pgs.
(Continued)

*Primary Examiner* — Kenneth Bukowski
(74) *Attorney, Agent, or Firm* — Maier & Maier, PLLC

(57) ABSTRACT

A display medium with a substrate provided with a plurality of virtual cells C, and, on the cell C, a partition P having a plurality of surfaces respectively formed on a plane that intersects with the substrate and exposed when the display medium is viewed from a plurality of directions. A portion exposed when the display medium is viewed from a predetermined direction among the plurality of directions is given the color of a content corresponding to the predetermined direction. The display medium displays different contents in the plurality of directions, respectively.

6 Claims, 7 Drawing Sheets

(56) References Cited

U.S. PATENT DOCUMENTS

| | | | | |
|---|---|---|---|---|
| 11,222,453 | B1 * | 1/2022 | Aupetit | G06F 3/0486 |
| 2011/0038030 | A1 * | 2/2011 | Roosendaal | G09F 9/372 359/296 |
| 2018/0217307 | A1 * | 8/2018 | Kagotani | G09F 19/14 |
| 2020/0349872 | A1 * | 11/2020 | Sakurai | G09F 19/20 |
| 2023/0126599 | A1 * | 4/2023 | Sakurai | G06T 15/04 703/1 |
| 2023/0306880 | A1 * | 9/2023 | Sakurai | G09G 5/00 |

FOREIGN PATENT DOCUMENTS

| | | | |
|---|---|---|---|
| CN | 107106380 | A | 8/2017 |
| CN | 110419073 | A | 11/2019 |
| EP | 1990210 | A2 | 11/2008 |
| JP | 39-5169 | Y1 | 2/1964 |
| JP | 52-146592 | A | 12/1977 |
| JP | 3128099 | U | 12/2006 |
| JP | 2011146940 | A | 7/2011 |
| JP | 6374625 | B1 | 8/2018 |
| WO | 2017/065289 | A1 | 4/2017 |

OTHER PUBLICATIONS

Japanese Office Action dated Feb. 12, 2020 in corresponding application No. 2019-216794; 8 pgs.
Japanese Office Action dated Apr. 23, 2020 in corresponding application No. 2019-216794; 8 pgs.
Office Action dated Jun. 29, 2023, in corresponding Chinese Application No. 202080065466.3, 18 pages.
Office Action dated Nov. 28, 2023, in corresponding Chinese Application No. 202080065466.3, 16 pages.

* cited by examiner

DISPLAY MEDIUM, PROCESSING DEVICE, AND PROCESSING PROGRAM

TECHNICAL FIELD

The present invention relates to a display medium that displays different contents in a plurality of directions, and a processing device and a processing program that calculate a color given to a face of a partition of the display medium.

BACKGROUND

A display medium that displays different images depending on the direction attracts the attention of viewers and is easily noticed. Therefore, for example, the display medium is used for posters and cards for advertisements. In general, special device and material are required to manufacture the display medium.

There is a display medium that can display a plurality of information items in order to achieve the efficient display of information by the display medium, (see Patent Document 1). According to the invention described in Patent Document 1, a flat member to which a color is applied is divided into a plurality of sub-cells, and a projecting member for visually recognizing the color of the sub-cell is formed on the flat member. The projecting member is formed on the flat member so as to be parallel to a designated direction and perpendicular to the flat member. When the display medium is observed in the designated direction, the color applied to the sub-cell that is parallel to the designated direction is observed in the designated direction.

CITATION LIST

Patent Document 1: Japanese Patent No. 6,374,625

SUMMARY

In the display medium described in Patent Document 1, since the projecting member has a single color, a color gamut is narrow. In addition, since content is displayed in some colors provided on the flat member, the brightness of each content displayed by the display medium may be low.

Accordingly, an object of the invention is to provide a display medium, a processing device, and a processing program that can display a plurality of contents having a wide color gamut and high brightness.

In order to solve the above-mentioned problems, a first aspect of the invention relates to a display medium that displays different contents in a plurality of directions. The display medium according to the first aspect of the invention includes: a substrate including a plurality of virtual cells; and a partition that is provided in the cell and has a portion which is a face formed on a plane intersecting the substrate and is exposed when the display medium is observed in each of the plurality of directions. A color of a content corresponding to a predetermined direction among the plurality of directions is given to a portion which is exposed when the display medium is observed in the predetermined direction.

Here, the portion which is exposed when the display medium is observed in the predetermined direction among the plurality of directions may have a portion which is shielded when the display medium is observed in a direction other than the predetermined direction among the plurality of directions.

Here, the color of the content corresponding to the predetermined direction may be given to a portion, which is exposed when the display medium is observed in the predetermined direction, in the substrate.

A skeleton of the partition may include a portion of a Voronoi face in a Voronoi diagram that has a generating point virtually provided on each of the plurality of directions.

A second aspect of the invention relates to a processing device that calculates a color given to a face of the partition of the display medium. In the second aspect, a face forming the partition is virtually divided into a plurality of sub-cells. The processing device according to the second aspect includes a color determination unit that specifies the sub-cell visually recognized in each of the plurality of directions and determines a color given to the sub-cell such that a color formed by the color of each of the sub-cells visually recognized in each of the plurality of directions is close to a color of a portion of the partition in a content corresponding to each of the plurality of directions.

A third aspect of the invention relates to a processing program that calculates a color given to a face of the partition of the display medium. In the third aspect, a face forming the partition is virtually divided into a plurality of sub-cells. The processing program according to the third aspect causes a computer to function as a color determination unit that specifies the sub-cell visually recognized in each of the plurality of directions and determines a color given to the sub-cell such that a color formed by the color of each of the sub-cells visually recognized in each of the plurality of directions is close to a color of a portion of the partition in a content corresponding to each of the plurality of directions.

According to the invention, it is possible to provide a display medium, a processing device, and a processing program that can display a plurality of contents having a wide color gamut and high brightness.

BRIEF DESCRIPTION OF THE DRAWINGS

DETAILED DESCRIPTION hereinafter, an embodiment of the invention will be described with reference to the drawings. In the following description of the drawings, the same or similar portions are denoted by the same or similar reference numerals.

(Display Medium)

Figure 1:
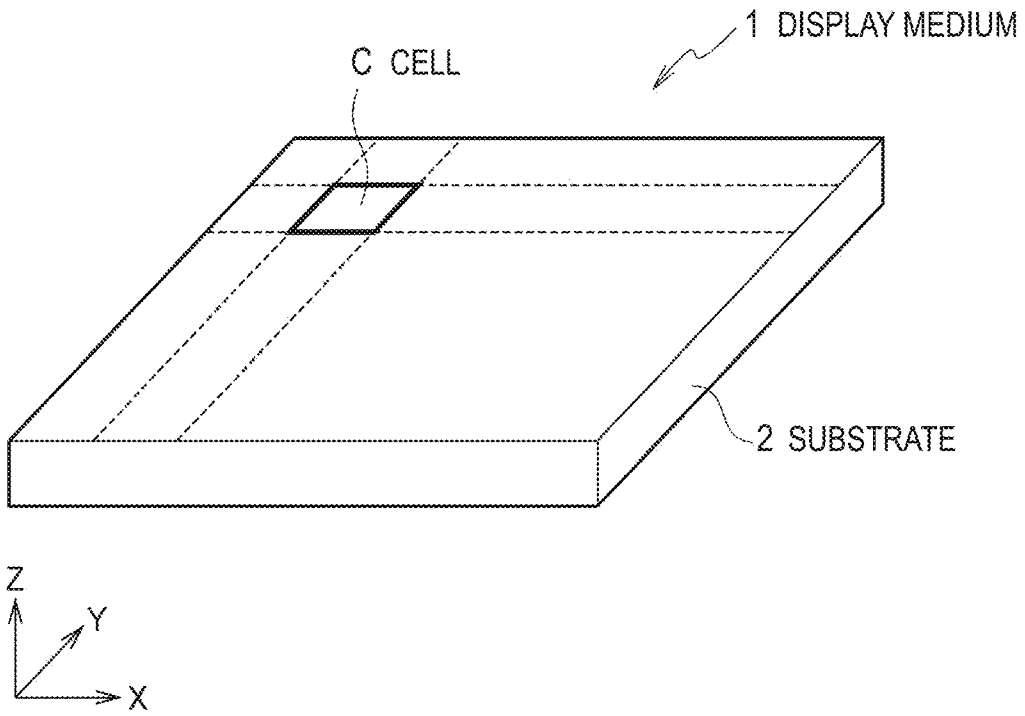
FIG. 1 is a perspective view illustrating a display medium according to an embodiment of the invention.

A display medium 1 according to the embodiment of the invention will be described with reference to FIG. 1. The display medium 1 according to the embodiment of the invention is formed so as to display different contents in a plurality of directions. The display medium 1 is observed in each predetermined direction and can display different contents in each direction.

In the embodiment of the invention, a direction in which the display medium 1 displays content is referred to as a designated direction. In addition, a direction in which the display medium 1 is visually recognized from a point of view on the designated direction is referred to as a direction of a line of sight. Further, in the embodiment of the invention, the designated direction in which the content can be displayed may be within a range of a predetermined angle with respect to the display medium 1.

The content displayed by the display medium 1 in each designated direction is any still image. The display medium 1 can display any content in each designated direction. There are no restrictions, such as the configuration similarity of the object or the commonness of a portion of the object, among the plurality of contents displayed by the display medium 1. The display medium 1 can display any content indicating different meanings in each designated direction. This makes it possible for a user who visually recognizes the display medium 1 to understand different kinds of information from each content displayed in each designated direction. Therefore, the display medium 1 can transmit a large amount of information.

In the embodiment of the invention, each content displayed in the designated direction is any still image, and the contents have different objects. In the embodiment of the invention, the object is a tangible object, a letter, a symbol, a number, or the like expressed by the content and is a mass of pixels expressing an object. The object may be clearly displayed against the background. In the embodiment of the invention, in each content displayed in each designated direction, the way to overlap a plurality of objects is not changed or deformed. Each content can include objects having completely different colors, shapes, and the like. In the embodiment of the invention, the content displayed in one designated direction can include letters in a plain background, and the content expressed in another designated direction can include a map of a person in a city background.

In addition, the user who visually recognizes the display medium 1 from a direction away from any of the designated directions visually recognizes content different from the content intended by the display medium 1. The content that is different from the content intended by the display medium 1 is content that is not intended to make the user understand predetermined information from the displayed content of the content and is content whose meaning is difficult for the user to understand from the content in many cases.

When the display medium 1 is observed from a space above the display medium 1 illustrated in FIG. 1 while the position of the line of sight is changed, there is a position where the meaning can be understood from the content displayed by the display medium 1 and there is a position where the meaning is difficult to understand. The position where the meaning can be understood from the content is a position on one of a plurality of designated directions assumed by the display medium 1 or a position near the designated direction.

As illustrated in FIG. 1, the display medium 1 has a substrate 2. The substrate 2 does not specularly reflect light, but has the property of transmitting at least a portion of light.

The substrate 2 includes a plurality of virtual cells C. The cells C may be formed virtually, and adjacent cells C may not be visually distinguished.

In the embodiment of the invention, the substrate 2 has a plane, and a plurality of cells C are formed on the plane. In the example illustrated in FIG. 1, the plane is an XY plane and is provided in an upper portion of the substrate 2. In another example, the substrate 2 may have a curved surface, and a plurality of cells C may be formed on the curved surface.

In the embodiment of the invention, light sources are present in all directions. A color given to the display medium 1 is isotropically diffused in all directions.

(Partition)

Figure 2:
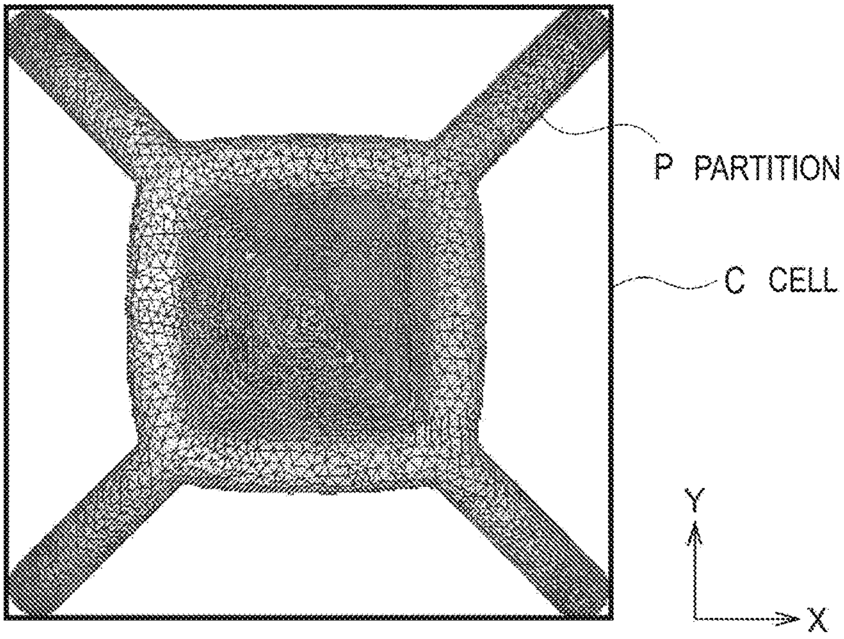
FIG. 2 is a top view illustrating a cell and a partition according to the embodiment of the invention.

As illustrated in FIG. 2, a partition P is provided in each cell C. The partition P has a portion which is a face formed on a plane intersecting the substrate 2 and is exposed when the display medium 1 is observed in each of a plurality of directions. The partition P is made of a member having a shielding property such as an ultraviolet (UV) curing resin containing a pigment or gypsum. In the example illustrated in FIG. 2, the partition P is provided so as to come into contact with an outer edge of the cell C.

The partition P has a convex shape that protrudes from the substrate 2. A color expressing the content is given to a surface portion other than a portion, which comes into contact with the substrate 2, in the partition P. In the display medium 1 according to the embodiment of the invention, the color of the content is given in a convex shape. Therefore, the area to which the color of the content is given is larger than that in a case in which the color of the content is given to the substrate. Even when a plurality of contents are displayed by one medium, the display medium 1 including the partition P can form a large area expressing each content. Therefore, it is possible to display content with a wide color gamut and high brightness.

Figure 3:
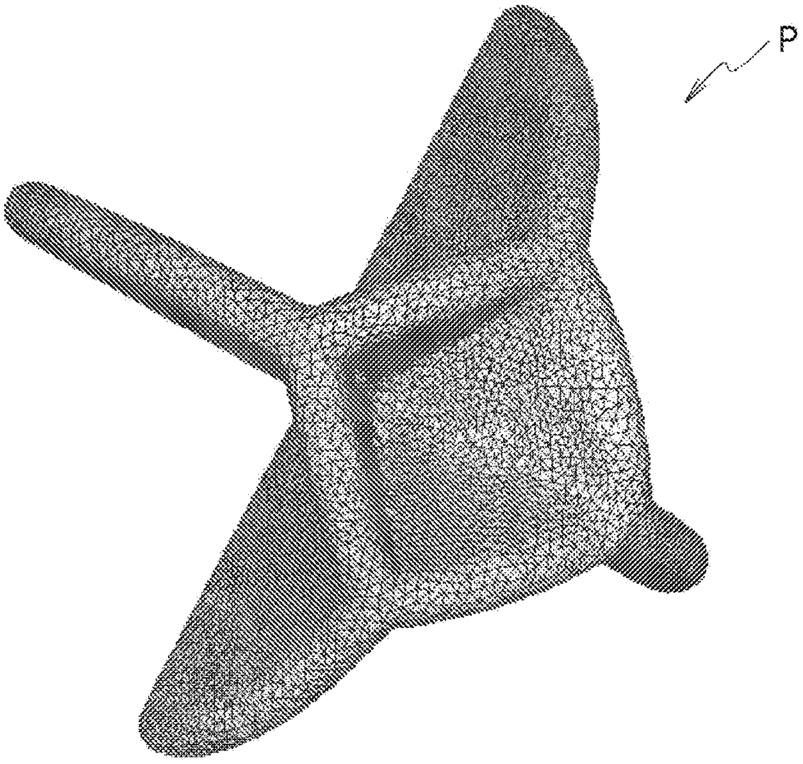
FIG. 3 is a perspective view illustrating the partition according to the embodiment of the invention.

As illustrated in FIGS. 2 and 3, the partition P has a plurality of faces. The partition P has one or more faces for one designated direction of the display medium 1. This face faces the direction of the line of sight in which the display medium 1 is visually recognized from the point of view on one designated direction and is exposed when the display medium 1 is visually recognized from the point of view. The face exposed in the designated direction expresses the color of the content corresponding to the designated direction.

More specifically, the color of the content corresponding to a predetermined direction is given to a portion, which is exposed when the display medium 1 is observed in the predetermined direction among a plurality of directions, in the surface of the partition P. For each designated direction of the display medium 1, a portion of the surface of the partition P is exposed in the designated direction when the display medium 1 is observed in the designated direction, and the color of the content corresponding to the designated direction is given to the exposed portion. Therefore, since the partition P has a plurality of faces, it is possible to express a portion of the content corresponding to each designated direction for the plurality of designated directions.

In some cases, even a portion that is exposed in a predetermined designated direction is exposed in another designated direction. Colors suitable for a plurality of contents corresponding to the plurality of designated directions are given to the portions exposed in the plurality of designated directions.

The partition P illustrated in FIGS. 2 and 3 is given five content colors in five designated directions. The five designated directions are a normal direction of the cell C with respect to the substrate 2, a direction of an azimuth of 0 degrees and an elevation angle of 45 degrees, a direction of an azimuth of 90 degrees and an elevation angle of 45 degrees, a direction of an azimuth of 180 degrees and an elevation angle of 45 degrees, and a direction of an azimuth of 270 degrees and an elevation angle of 45 degrees. Here, the azimuth indicates the orientation of the cell C on the XY plane of the substrate 2, and the elevation angle is an angle formed between the XY plane of the substrate 2 of the cell C and the line of sight from the XY plane to a point in the Z direction.

In the example illustrated in FIGS. 2 and 3, the partition P has 16 triangular faces facing a plurality of lines of sight. The partition P has four triangular faces in the normal direction of the cell C with respect to the substrate 2. These four faces express a portion of the content corresponding to the normal direction. In addition, the partition P has three triangular faces in each of four directions other than the normal direction. Each of the three faces expresses a portion of the content corresponding to each direction.

The partition P illustrated in FIGS. 2 and 3 is formed in each cell C that is formed in the display medium 1. When the display medium 1 is observed in a predetermined designated direction, the content corresponding to the point of view is expressed by the color given to the face of the partition P facing the direction of the line of sight.

The shape of the partition P will be described with reference to FIG. 4. In the embodiment of the invention, a Voronoi diagram for generating points that are virtually provided in the designated directions is virtually formed. The skeleton of the partition P includes a Voronoi face in the Voronoi diagram. The partition P is obtained by fleshing out the Voronoi faces which are the skeleton. The surface of the partition P includes a face that is parallel to the Voronoi face.

Figure 4:
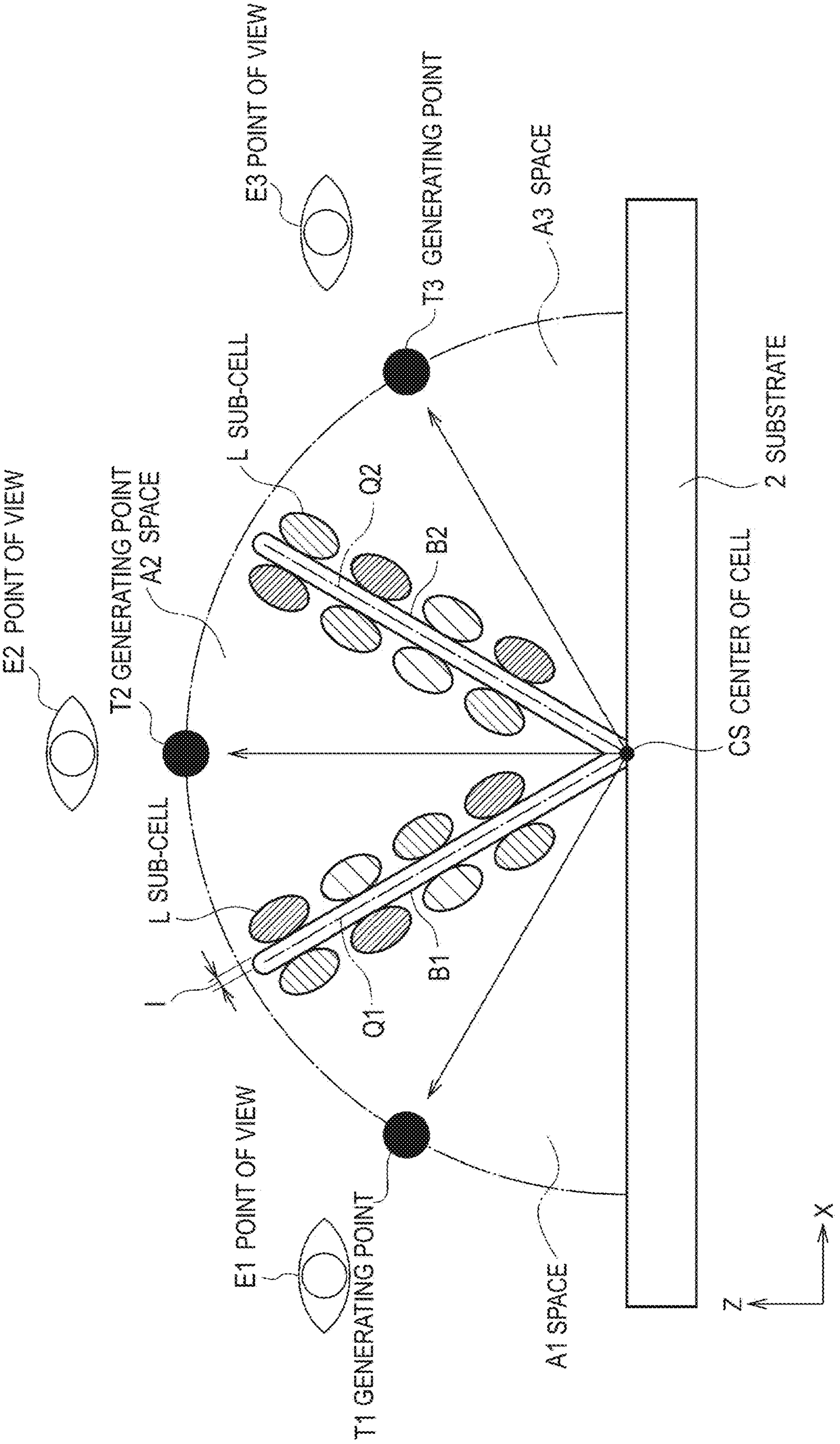
FIG. 4 is a diagram illustrating the partition according to the embodiment of the invention.

In the example illustrated in FIG. 4, three points of view E1, E2 and E3 are provided. Generating points T1, T2, and T3 are provided on the lines of sight when a center Cs of the cell C is visually recognized from each of the points of view E1, E2, and E3. The generating points T1, T2, and T3 are provided on a virtual sphere with a predetermined radius which has the center Cs of the cell C as its center.

The partition P has one or more shielding members B. The shielding member B has the Voronoi face as a skeleton and is obtained by fleshing out the Voronoi face. The shielding member B divides a space above the cell C in which the partition P is provided into regions for each designated direction.

In the example illustrated in FIG. 4, the partition P has shielding members B1 and B2. The shielding member B1 has a Voronoi face Q1 as the skeleton and is obtained by fleshing out the Voronoi face Q1 with a thickness 1. The shielding member B2 has a Voronoi face Q2 as the skeleton and is obtained by fleshing out with the Voronoi face Q2 with the thickness 1. In addition, the tip of the shielding member B1 is formed in a circular shape with a radius 1.

The shielding member B1 divides the space above the cell C into a space A1 corresponding to the point of view E1 and a space A2 corresponding to the point of view E2. The shielding member B2 divides the space above the cell C into the space A2 corresponding to the point of view E2 and a space A3 corresponding to the point of view E2.

In the surface of the partition P, the portion that is exposed when the display medium 1 is observed in a predetermined designated direction among the plurality of designated directions has a portion that is shielded when the display medium 1 is observed from a direction other than the predetermined designated direction among the plurality of designated directions. In some cases, even when the surface of the partition P is exposed to one or more predetermined designated directions, it is not seen in other designated directions. The surface of the partition P expresses the color of the content corresponding to the designated direction in which the surface is exposed. Therefore, the display medium 1 can express portions of different contents in a plurality of designated directions. As a result, it is possible to display a plurality of contents having a wide color gamut and high brightness.

In the example illustrated in FIG. 4, a face of the shielding member B1 which is close to the space A1 has a portion that is visually recognizable from the point of view E1, but is not visually recognizable from the point of view E2 or the point of view E3. A face of the shielding member B1 which is close to the space A2 has a portion that is visually recognizable from the point of view E2, but is not visually recognizable from the point of view E1 or the point of view E3. A face of the shielding member B2 which is close to the space A2 has a portion that is visually recognizable from the point of view E2, but is not visually recognizable from the point of view E1 or the point of view E3. A face of the shielding member B2 which is close to the space A3 has a portion that is visually recognizable from the point of view E3, but is not visually recognizable from the point of view E1 or the point of view E2.

Each face of the partition P is formed so as to be easily visually recognized in the designated direction and not to be easily visually recognized in the other designated directions. Each face of the partition P has both the effect of emitting a color forming the content in the designated direction and the effect of shielding light in the directions other than the designated direction. Therefore, the display medium 1 can display any different contents in each designated direction. Further, the display medium 1 can display content having a wide color gamut and high brightness in each designated direction. Since the influence of the line of sight on each face of the partition P in directions other than the designated direction is suppressed, it is possible to give a suitable color to the face observed in the designated direction.

In the embodiment of the invention, the skeleton of the partition P is formed on the Voronoi face formed with respect to the generating point. The Voronoi face is formed so as to pass through the middle between adjacent generating points among the generating points and to block the line of sight from each generating point. The face of the partition P is formed by giving a predetermined thickness to the Voronoi face formed in this way.

A color is given to the surface of the partition P formed in this way to give the color of the content to a wide face, which makes it possible to improve the visibility (brightness) of the content.

Further, in the embodiment of the invention, the display medium 1 is formed by a 3D printer. Therefore, the shape and accuracy of the partition P depend on the performance of the 3D printer for forming the partition. For example, the visibility in the designated direction can be improved by forming the Voronoi face with a small thickness to form the partition P within the range of the performance of the 3D printer.

Next, a method for calculating the shape of the partition P provided in a certain cell will be described. In advance, the size of the cell C (the length in the X-axis direction and the length in the Y-axis direction), the designated directions, and the number (n) of designated directions are specified. Here, the cell C has a square shape that has the same length in the X-axis direction and the Y-axis direction. In addition, the distance of the cell C on a diagonal line is 2r.

A virtual hemisphere with a radius r which has the center Cs of the cell C as its center is assumed. An intersection point with the hemisphere when the center Cs is observed in the designated direction is defined as the generating point corresponding to the designated direction. In the example illustrated in FIG. 4, the generating point T1 is determined for the designated direction in which the point of view E1 is observed from the center Cs. Similarly, the generating point T2 is determined for the designated direction in which the point of view E2 is observed from the center Cs. The generating point T3 is determined for the designated direction in which the point of view E3 is observed from the center Cs.

When the generating point corresponding to each designated direction is determined, a three-dimensional Voronoi diagram is determined by dividing the space above the cell C into regions according to the distance to the generating point. A portion obtained by cutting the three-dimensional Voronoi diagram into a virtual hemisphere with the radius r which has the center Cs of cell C as its center is the skeleton (center/core) of the partition P.

The skeleton of the partition P is a portion of the Voronoi face in the Voronoi diagram for the generating points virtually provided on each of a plurality of directions.

However, the skeleton of the partition P obtained by calculation is a so-called manifold which has no thickness and is not capable of being shaped. Therefore, a face M is provided at a position that is a designated distance l away from the skeleton as the center. The face M is formed such that the distance to the nearest skeleton is 1. A three-dimensional shape including the face M is the partition P. In addition, the distance l is sufficiently smaller than the radius r of the hemisphere. When the value of the distance l is large, the area of the face to which a color is given is small, and the visibility is likely to be reduced. Therefore, it is preferable that the distance l is as small as possible. The value of the distance l depends on the performance of the device (3D printer) for forming the partition P.

Here, the face M included in the partition P is represented by Expression (1).

[Equation 1]

$$M=\{x\,|\,\|x-s\|-l=0, s\in S\} \qquad \text{Expression (1)}$$

M: Face constituting partition x: Point on M

S: Skeleton of partition l: Shortest distance from skeleton to face M of partition In addition, the specific shape of the partition P may be appropriately changed. For example, as illustrated in FIG. 4, the plurality of shielding members formed in the partition P may be formed integrally or individually.

Further, in the example illustrated in FIG. 4, a case in which the color of the content is not provided on the substrate 2 has been described. However, the invention is not limited thereto. For example, a portion of the substrate 2 which is exposed when it is observed in a predetermined direction may be given the color of the content corresponding to the predetermined direction. For example, a portion of the substrate 2 which comes into contact with the space A1 may be given the color of the content corresponding to the designated direction from the point of view E1. Similarly, a portion of the substrate 2 which comes into contact with the space A3 may be given the color of the content corresponding to the designated direction from the point of view E3. The brightness of the content can be increased by giving the color of the content on the substrate 2.

Furthermore, the skeleton of the partition P includes the intersection point of the lines of sight when the display medium 1 is observed in a plurality of directions. As illustrated in FIGS. 2 and 3, in a case in which the designated directions are provided symmetrically with respect to the center Cs of the cell C, the intersection point of the lines of sight is provided at the center Cs of the cell C. In addition, the intersection point of the lines of sight is an intersection point of the Voronoi faces in the Voronoi diagram having the generating points virtually provided on each of the plurality of directions. In other words, the shielding members of the partition P are formed so as to radially divide the space above the cell from the center Cs of the cell C.

As illustrated in FIGS. 2 to 4, the face forming the partition P is virtually divided into a plurality of sub-cells L. A portion of the partition P which can be seen from at least one of the plurality of designated directions is divided into a plurality of sub-cells L. Each sub-cell L is given the color that expresses the content. Each sub-cell L does not need to be visually divided and may be virtually divided. For example, adjacent sub-cells L may be given the same color, and the sub-cells L may not be visually distinguished.

In addition, the plurality of sub-cells L illustrated in FIG. 4 are separated from each other for the sake of explanation. However, it is preferable that the plurality of sub-cells L are formed so as to be adjacent to each other. Further, the sub-cell L is illustrated in a large size in FIG. 4 in order to improve visibility. However, the invention is not limited thereto.

The size of the sub-cell L is sufficiently small with respect to the distance from the point of view. The point of view is provided at a distance where juxtaposed additive color mixture is established.

The sub-cell L is a region that divides the surface of the partition P. For example, as illustrated in FIGS. 2 and 3, the sub-cell L is a region corresponding to an intersection point when the surface of the partition P is divided into a mesh shape. The sub-cell L may be a region that has, as an apex, an intersection point when the surface is divided into the mesh shape or may be a region that has the intersection point as the center.

A method for calculating the color to be given to the surface of the partition P will be described.

First, the sub-cell L that is visually recognized in the designated direction is specified for each designated direction. Here, the partition P is rendered in each designated direction to specify the sub-cell L that is seen in the designated direction and the sub-cell L that is not seen in the designated direction. For each designated direction assumed by the display medium 1, the sub-cell L that is seen in the designated direction and the sub-cell L that is not seen in the designated direction are specified.

Next, a method for specifying the color to be given to each sub-cell L will be described. The color value of each sub-cell L is determined such that the color value of the cell in which the sub-cell L of the content corresponding to each designated direction is located can be expressed with the sub-cell L visually recognized in each designated direction. In this case, the color value of the content may be expressed with a plurality of sub-cells L that are visually recognized in the designated direction by the juxtaposed additive color mixture.

Specifically, the color of each sub-cell L is determined by Expression (2) such that a color Ac of the partition P seen in the designated direction is close to a color B of the cell to be processed in the content corresponding to the designated direction. The color Ac of the partition P is expressed by the mixture of the colors given to each sub-cell L that can be visually recognized in the designated direction.

[Equation 2]

$$\underset{c}{\operatorname{argmin}}\|Ac-B\| \quad \text{Expression (2)}$$

A: Matrix indicating whether or not each sub-cell is visually recognized in each designated direction (n×p) (1 in case in which sub-cell is seen in designated direction, and 0 in case in which sub-cell is not seen in designated direction)

n: Number of designated directions p: Number of sub-cells c: Color of each sub-cell (p×3)

B: Matrix of color of cell to be processed in content corresponding to designated direction (n×3)

In addition, the color of each sub-cell L may be represented by a matrix of three parameters when the color is represented by three primary colors such as RGB (Red, Green, Blue) or CMY (Cyan, Magenta, Yellow).

When the color of each sub-cell L is determined for one cell in this way, the color of each sub-cell L is determined for the other cells by the same method as described above.

The partition P that has been formed and colored in this way is disposed in each cell, which makes it possible for the display medium 1 to display different contents in each designated direction.

The display medium 1 according to the embodiment of the invention can display a plurality of contents having a wide color gamut and high brightness since the area of the cell in which the partition P is provided is increased to express a portion of the content corresponding to the designated direction.

(Processing Device)

A processing device 3 according to the embodiment of the invention will be described with reference to FIG. 5. The processing device 3 calculates the color of each sub-cell L of the partition P such that an output image (content) displayed in each designated direction is close to a desired target image.

The processing device 3 calculates the Voronoi face for the generating point on the designated direction and specifies the shape of the partition P having the Voronoi face as the center. The processing device 3 divides the surface of the partition P into a plurality of sub-cells L and determines whether or not each sub-cell L is seen in each designated direction. The processing device 3 optimizes the color of each sub-cell L such that the content corresponding to each designated direction can be displayed with the color given to the sub-cell L seen in each designated direction.

In addition, in the embodiment of the invention, the case in which the processing device 3 calculates the shape of the partition P and the color of the sub-cell L has been described. However, the invention is not limited thereto. For example, the shape of the partition P and the color of the sub-cell L may be calculated manually. Further, the shape of the partition P may be designed by using a tool such as a ruler or a compass.

The processing device 3 is a general computer that includes a storage device 10, a process control device 20, and an input/output interface 30. The general computer executes a processing program to implement functions illustrated in FIG. 5.

The storage device 10 is a read only memory (ROM), a random access memory (ROM), a hard disk, or the like and stores various kinds of data such as input data, output data, and intermediate data, used for the process control device 20 to perform processes. The process control device 20 is a central processing unit (CPU) that reads data stored in the storage device 10 and writes data to the storage device 10, or inputs and outputs data to and from the input/output interface 30 to perform the processes of the processing device 3.

The input/output interface 30 is an interface with an external device that inputs and outputs data to and from the process control device 20. In the embodiment of the invention, the input/output interface 30 outputs the shape of the partition P and the color of the sub-cell L on the partition P to a device for manufacturing the partition P. The manufacturing device forms the partition P on the basis of the input shape and color of the partition P.

In the embodiment of the invention, the manufacturing device is a 3D printer. Data of the color of the sub-cell L on the partition P may be input from the processing device to the manufacturing device through a communication network, a communication cable, or the like. The data of the color of the sub-cell L on the partition P may be input to the manufacturing device through a storage medium such as a universal serial bus (USB) memory. In the embodiment of the invention, the case in which the 3D printer forms and colors the partition P has been described. However, the invention is not limited thereto. For example, the partition P may be formed and colored by different devices.

The storage device 10 stores the processing program and also stores condition data 11, shape data 12, input pixel value data 13, and color value data 14. The condition data 11 and the input pixel value data 13 are given in advance before the process of the process control device 20.

The condition data 11 includes data on conditions that are necessary for determining the shape and color of the partition P. The conditions include, for example, the designated directions, the number of designated directions, and the shape and position of the cell C of the display medium 1.

The shape data 12 is data for specifying the shape of the partition P. The shape data 12 may be generated in a format that can be read by the manufacturing device.

The input pixel value data 13 is data of the target image of the output image output by the display medium 1 in each direction. The input pixel value data 13 specifies a color value corresponding to each cell formed on the display medium 1 in each designated direction. The input pixel value data 13 has, for example, a color value for each section having the same arrangement as each cell of the display medium 1. The color value is, for example, each of the values of the three primary colors of RGB.

The color value data 14 specifies a color value given to each sub-cell L of the partition P. The color value is, for example, each of the values of the three primary colors of RGB, as in the input pixel value data 13.

The process control device 20 includes a shape specification unit 21, a shape output unit 22, a color determination unit 23, and an output unit 24.

The shape specification unit 21 specifies the shape of the partition P. First, the shape specification unit 21 calculates the Voronoi face for the generating point provided on each designated direction. The shape specification unit 21 further calculates a shape, in which a predetermined thickness has been given to the calculated Voronoi face, as the shape of the partition P. The shape specification unit 21 generates the shape data 12 for specifying the calculated shape of the partition and stores the shape data 12 in the storage device 10.

The shape specification unit 21 may further deform the calculated shape of the partition depending on the performance of the manufacturing device for forming the partition P.

In addition, the shape specification unit 21 may specify the shape of the partition P for each cell C or may specify the shape of the partition P common to each cell. For example, it is preferable that the shape specification unit 21 specifies the shape of the partition P for each cell C in a case in which the point of view and the display medium 1 are close to each other and the point of view needs to deviate to view the display medium 1, in a case in which there is a large difference in the direction of the line of sight when each cell is seen from a predetermined point of view, or in a case in which the accuracy required for the display medium 1 is high. On the other hand, for example, it is preferable that the shape specification unit 21 specifies the shape of the partition P common to each cell in a case in which the distance between the point of view and the display medium 1 is equal to or greater than a predetermined value and the display medium 1 can be seen from the point of view, in a case in which there is a small difference in the direction of the line of sight when each cell is seen from a predetermined point of view, or in a case in which the accuracy required for the display medium 1 is low.

The shape output unit 22 outputs the shape data 12 generated by the shape specification unit 21 to the manufacturing device through the input/output interface 30. The manufacturing device forms the partition P in each cell C of the display medium 1 on the basis of the input shape data 12.

The color determination unit 23 determines the color of each sub-cell L provided on the surface of the partition P.

First, the color determination unit 23 specifies the sub-cell L visually recognized in each of a plurality of directions. The color determination unit 23 determines whether or not each sub-cell L of the partition P is seen in each designated direction. In addition, the color determination unit 23 determines the color given to the sub-cell L such that a color formed by the colors of each sub-cell L visually recognized in each of the plurality of directions is close to the color of a portion of the partition P of the content corresponding to each of the plurality of directions, as represented by Expression (2).

The color determination unit 23 specifies the color value of the cell to be processed in each target image displayed in each designated direction. The color determination unit 23 determines the color of each sub-cell L such that the mixture of the colors of the sub-cells L which can be visually recognized when the partition P is observed in the designated direction is the color value of the cell to be processed in the target image corresponding to the designated direction. The color determination unit 23 repeats the same process for each designated direction to optimize the color of each sub-cell L of the partition. In addition, similarly, for each partition P provided in each cell C of the display medium 1, the color determination unit 23 calculates the color given to each sub-cell on the surface of the partition P.

The color determination unit 23 generates the color value data 14 for specifying the optimized color of each sub-cell L. The color value data 14 specifies the color of each sub-cell L of each partition P provided in each cell C of the display medium 1. The color determination unit 23 stores the generated color value data 14 in the storage device 10.

The output unit 24 outputs the color value data 14 generated by the color determination unit 23 to the manufacturing device through the input/output interface 30. The manufacturing device colors each sub-cell L of the partition P provided in each cell C of the display medium 1 on the basis of the input color value data 14.

In addition, the display medium 1 according to the embodiment of the invention can display good content in the designated direction. Further, the display medium 1 can display content even when the point of view is slightly separated from the designated direction. For example, in a case in which the point of view is separated from the designated direction, but is far away from another designated direction, the content to be displayed in the designated direction is slightly deformed and displayed. In a case in which the deformation of the content is small or in a case in which the deformation is within a range in which the influence of the deformation on the recognition of the content is small, the user can understand the meaning and content of the content even when the content is deformed.

On the other hand, in a case in which the display medium 1 is visually recognized in a direction far away from any designated direction, for example, in a case in which the display medium 1 is visually recognized from the Voronoi face, the content that can be visually recognized by the user is different from the content intended by the display medium 1, and it is often difficult to make the user recognize the meaning and content of the content.

(Display Method)

Figure 6:
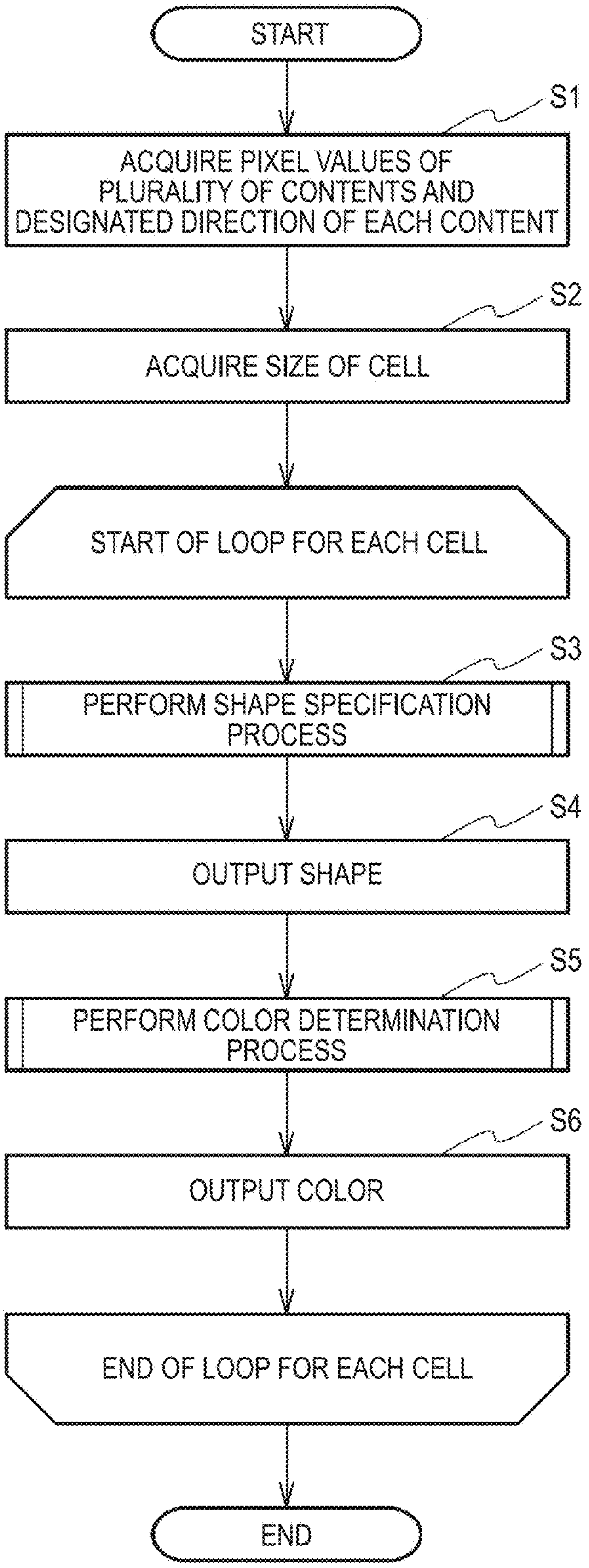
FIG. 6 is a flowchart illustrating a process of a display method according to the embodiment of the invention.
Figure 7:
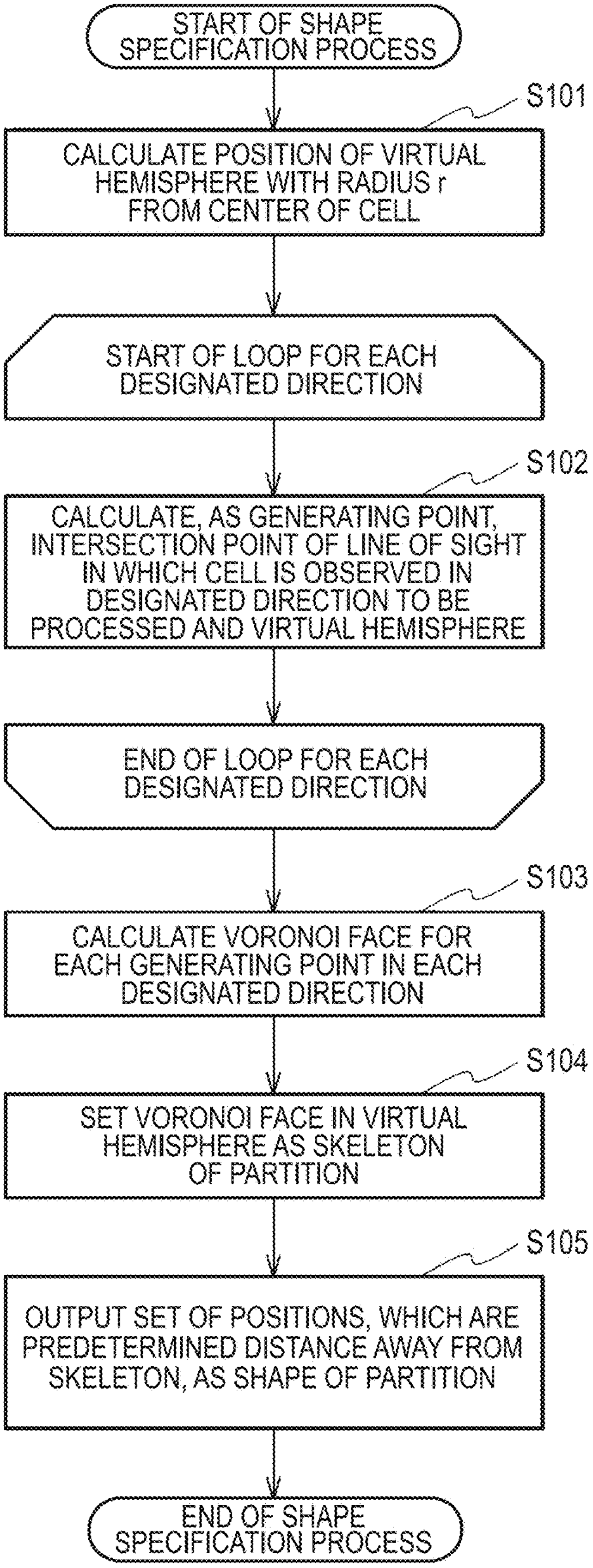
FIG. 7 is a flowchart illustrating a shape specification process according to the embodiment of the invention.
Figure 8:
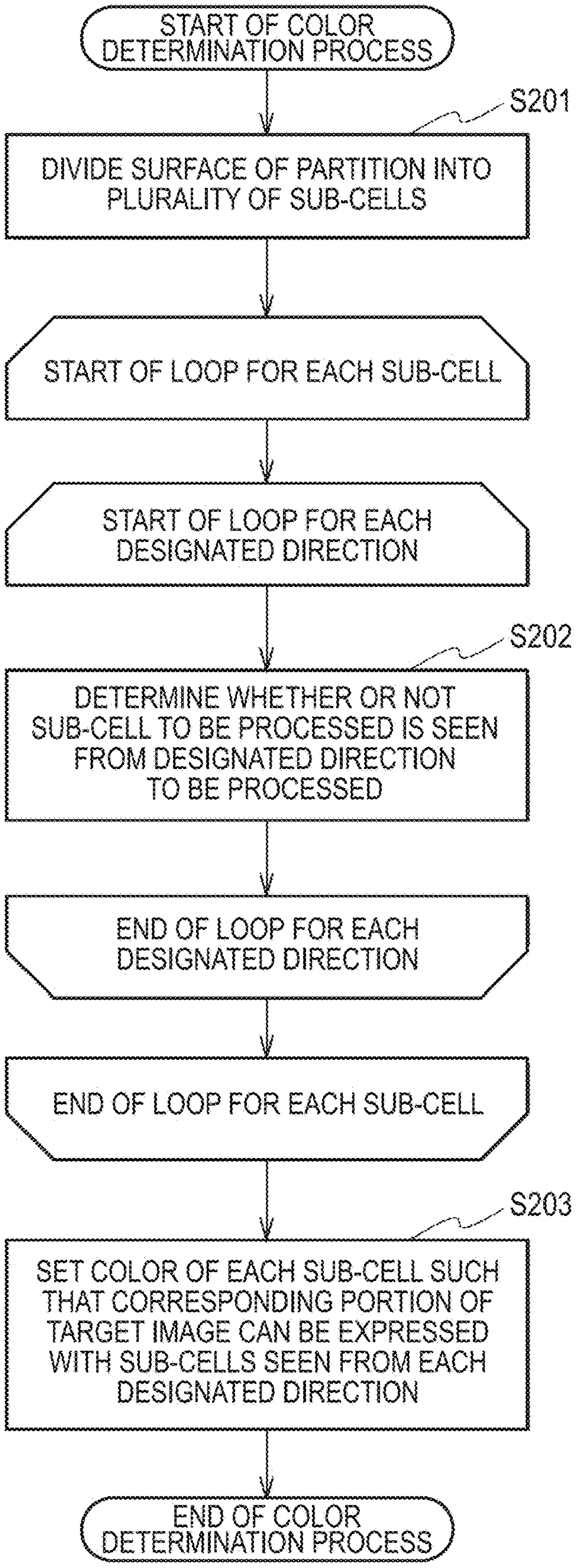
FIG. 8 is a flowchart illustrating a color determination process according to the embodiment of the invention.

In the embodiment of the invention, the process of specifying the shape and color of the partition P in the processing device 3 will be described with reference to FIGS. 6 to 8. In addition, the processing procedure described in FIGS. 6 to 8 is an example, and the invention is not limited thereto.

In Step S1, the processing device 3 acquires the pixel values of a plurality of contents displayed by the display medium 1 and information on the designated directions in which each content is displayed. In addition, in Step S2, the processing device 3 acquires the size of the cell C of the display medium 1. Each information item acquired in Step S1 and Step S2 is acquired from, for example, the condition data 11.

Processes in Steps S3 to S6 are repeated for each cell C of the display medium 1.

First, in Step S3, the processing device 3 specifies the shape of the partition P provided in the cell C to be processed with the shape specification unit 21. A process of specifying the shape of the partition P will be described in detail below with reference to FIG. 7. In Step S4, the processing device 3 outputs the shape of the partition P specified in Step S3.

In Step S5, the processing device 3 specifies the color given to the surface of the partition P with the color determination unit 23. A process of specifying the color given to the surface of the partition P will be described in detail below with reference to FIG. 8. In Step S6, the processing device 3 outputs the color of the partition P specified in Step S5.

When the processes in Steps S3 to S6 are performed for each cell C of the display medium 1, the processing device 3 ends the process.

The shape specification process of the shape specification unit 21 will be described with reference to FIG. 7. A process illustrated in FIG. 7 corresponds to the process in Step S3 in FIG. 6.

In Step S101, the shape specification unit 21 calculates the position of the virtual hemisphere having the radius r from the center Cs of the cell C to be processed.

The shape specification unit 21 repeats the process in Step S102 for each designated direction. In Step S102, the shape specification unit 21 calculates, as the generating point, the intersection point of the line of sight in which the cell C is observed in the designated direction to be processed and the virtual hemisphere calculated in Step S101. When the generating point is calculated for each designated direction, the process proceeds to Step S103.

In Step S103, the shape specification unit 21 calculates the Voronoi face for each generating point calculated in Step S102. In Step S104, the shape specification unit 21 specifies the shape of the Voronoi faces in the virtual hemisphere calculated in Step S101 among the Voronoi faces calculated in Step S103 as the skeleton of the partition P provided in the cell C to be processed. The Voronoi faces calculated in Step S103 are cut into the virtual hemisphere calculated in Step S101, and the inside of the virtual hemisphere is the skeleton of the partition.

In Step S104, the shape specification unit 21 gives a thickness to the skeleton of the partition P calculated in Step S104 to specify the shape of the partition P. Here, a set of the positions that are a predetermined distance away from the skeleton of the partition P specified in Step S104 is specified as the shape of the partition P. The specified shape of the partition is output as the shape data 12.

The color specification process of the color determination unit 23 will be described with reference to FIG. 8. A process illustrated in FIG. 8 corresponds to the process in Step S5 of FIG. 6.

In Step S201, the color determination unit 23 divides the surface of the partition provided in the cell C to be processed into a plurality of sub-cells L.

A process in Step S202 is performed for each sub-cell L divided in Step S201 and each designated direction. In Step S202, the color determination unit 23 determines whether or not the sub-cell L to be processed is seen in the designated direction to be processed. When the process in Step S202 for each sub-cell L and each designated direction ends, the process proceeds to Step S203.

In Step S203, the color determination unit 23 sets the color of each sub-cell L such that a target color value can be expressed by the sub-cells L seen in each designated direction. Here, the target color value is a color value expressed by the cell to be processed among the color values of each content displayed in each designated direction. The target color value is set for each designated direction. The color determination unit 23 optimizes the color value of each sub-cell L on the surface of the partition P so as to satisfy the requirement that the mixture of the colors of each sub-cell L seen in each designated direction is close to the color value of the cell to be processed in the content displayed in each designated direction.

As described above, the processing device 3 calculates the shape of the partition P in each cell and the color given to the partition P on the basis of Expressions (1) and (2) to form the display medium 1.

In addition, since the display medium 1 according to the embodiment of the invention can provide information having different meanings and contents in a plurality of directions, it is possible to provide more information in a limited region.

First Modification Example

In the embodiment of the invention, the case in which the content displayed by the display medium 1 in each designated direction is a still image has been described. However, the invention is not limited thereto. For example, in a case in which the surface of the partition P is formed by a display that can display a moving image and the surface of the partition can be dynamically changed, the content displayed by the display medium 1 in each designated direction may be a moving image. The display that can display a moving image is, for example, a liquid crystal display or an organic electro-luminescence (EL) display.

In this case, among a plurality of target moving images, each frame data item displayed at the same time is the target image. The processing device 3 optimizes the color of each sub-cell L on the partition P such that each frame data item simultaneously displayed in each designated direction in the moving image displayed by the display medium 1 is close to each target image.

Further, the sub-cell L according to the embodiment of the invention is formed on the display. The sub-cell L is a pixel or a plurality of adjacent pixel groups constituting the display.

Second Modification Example

In the embodiment of the invention, the case in which the display medium 1 is formed by the 3D printer has been described. However, the invention is not limited thereto. In the embodiment of the invention, the size of the display medium 1 is limited by the specifications of the 3D printer, but the display medium 1 may be formed in any size.

For example, the display method of the display medium 1 according to the embodiment of the present application can be applied to a large display with a size of several meters to several tens of meters such as an advertising billboard provided in a baseball stadium, a concert venue, an urban area, or the like. This large display is divided into a plurality of cells, and a partition having faces corresponding to a plurality of designated directions is formed in each cell. Colors constituting the output image corresponding to the designated direction are given to the surfaces of the partitions.

The display method according to the embodiment can be applied to this large display to display content corresponding to the position of each person to more people in a wider range.

For example, the large display installed in the outfield seats of the baseball stadium can display content suitable for each of the spectators on the first base side, the spectators on the third base side, and the spectators behind the back net. For example, the large display can display information on the team supported by many of the spectators on the first base side to the spectators on the first base side. At the same time, the large display can display information on the team supported by many of the spectators on the third base side to the spectators on the third base side.

In addition, the large display installed in the urban area can be used as a road guide sign or the like. It is possible to simultaneously provide different kinds of information corresponding to each designated direction to persons who are located in different designated directions with respect to the large display. For example, the large display can display signals in different designated directions such that traffic lights corresponding to a plurality of directions can be achieved by one display.

The display method according to the embodiment of the invention can provide information in a specific direction. For example, the display medium according to the embodiment of the invention can be installed at the intersection where a plurality of lanes are mixed, specify each lane, and display signals. This makes it possible to prevent the driver who enters the intersection from mistaking the display of a signal for another lane for the display of a signal for his or her lane.

Further, in the embodiment of the invention, the case in which the display medium displays the content that can be directly visually recognized by the human eye has been described. However, the invention is not limited thereto. The output image of the display medium may be captured by a camera, and a person may recognize the content through the captured image. In a case in which the display medium is huge, for example, a person may recognize the content through aerial imaging with a drone or the like.

Third Modification Example

It is also possible to apply the display medium according to the embodiment of the invention to a technique that provides a stereoscopic image seen with the naked eye.

The display medium according to the embodiment of the invention can display different contents in the designated direction. The designated direction in which the display medium according to a third modification displays the content is adjusted according to the difference between the left and right visual angles of the user who visually recognizes the display medium. The display medium displays content for the right eye in which the user can recognize a stereoscopic image in the designated direction of the right eye and displays content for the left eye in the designated direction of the left eye.

As described above, the display medium according to the third modification example may be applied to a naked-eye 3D display.

OTHER EMBODIMENTS

The embodiment of the invention and the modification examples 1 to 3 thereof have been described above. However, the statements and drawings that form a portion of the present disclosure should not be understood to limit the invention. It will be apparent to those skilled in the art that alternative embodiments, examples, and operational techniques can be made from the present disclosure.

Figure 5:
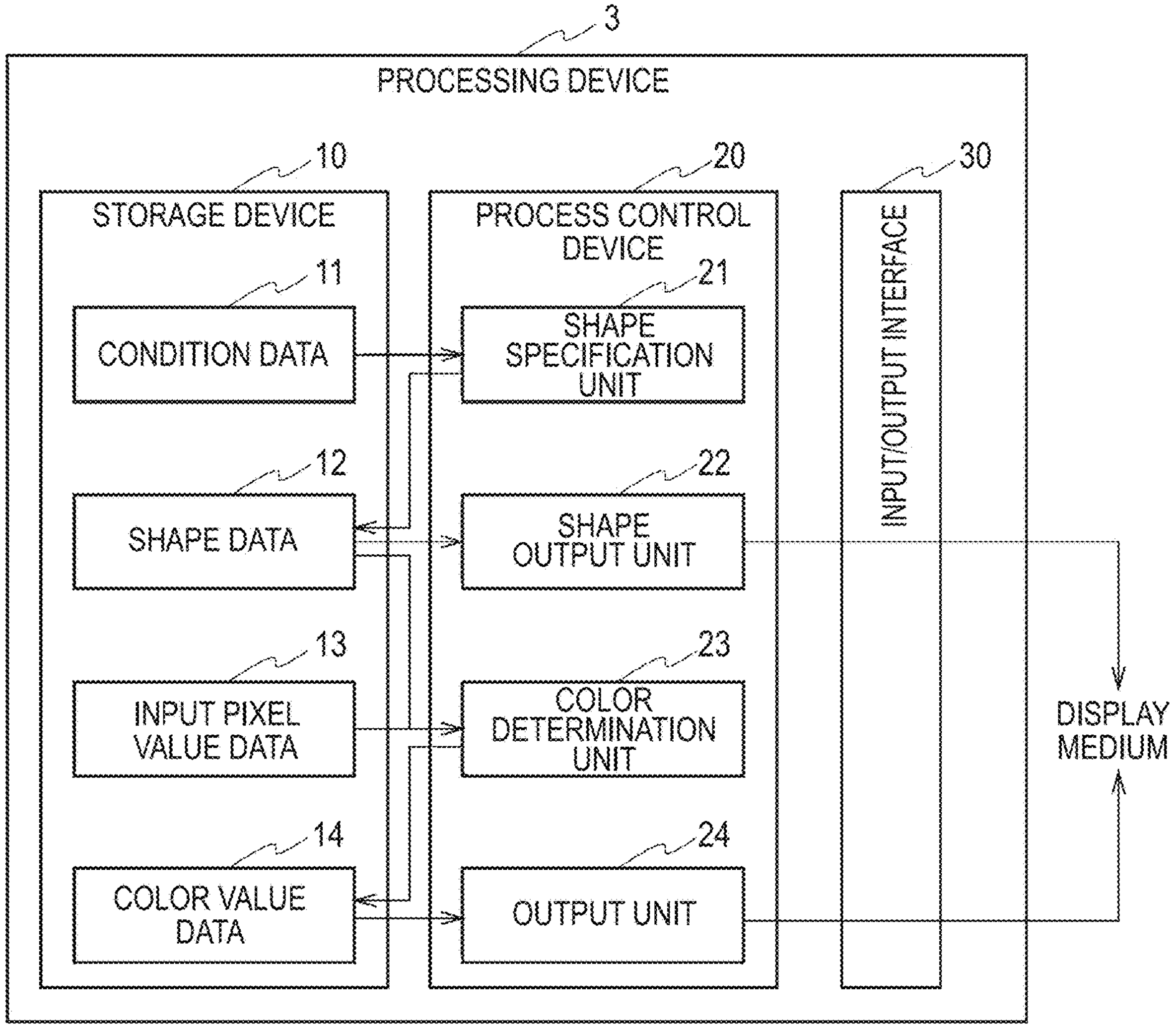
FIG. 5 is a diagram illustrating a hardware configuration and a functional block of a processing device according to the embodiment of the invention.

For example, the processing device described in the embodiment of the invention may be configured on one hardware as illustrated in FIG. 5 or may be configured on a plurality of hardware components according to its function and the number of processes. Further, the processing device may be implemented in the existing processing system that also implements other functions.

It goes without saying that the invention includes various embodiments which have not been described here. Therefore, the technical scope of the invention is defined only by the matters specifying the invention according to the reasonable claims from the above description.

REFERENCE SIGNS LIST

1 Display medium
2 Substrate
3 Processing device
10 Storage device
11 Condition data
12 Shape data
13 Input pixel value data
14 Color value data
20 Process control device
21 Shape specification unit
22 Shape output unit
23 Color determination unit
24 Output unit
30 Input/output interface
A Space
B Shielding member
C Cell
Cs Center
L Sub-cell
P Partition
T Generating point

The invention claimed is:

1. A display medium that displays different contents in a plurality of directions, the display medium comprising:
- a substrate including a plurality of virtual cells; and
- a partition that is provided in each virtual cell and has a portion which is a face formed on a plane intersecting the substrate and is exposed when the display medium is observed in each of the plurality of directions,
- wherein the partition comprises at least one shielding member which divides a space above the cell into a plurality of spaces corresponding to each of the plurality of directions;
- wherein each of the shielding members forms a Voronoi face centered between two adjacent generating points of the plurality of directions; and
- wherein a color of a content corresponding to a predetermined direction among the plurality of directions is given to a portion which is exposed when the display medium is observed in the predetermined direction.

2. The display medium according to claim 1,
- wherein the portion which is exposed when the display medium is observed in the predetermined direction among the plurality of directions has a portion which is shielded when the display medium is observed in a direction other than the predetermined direction among the plurality of directions.

3. The display medium according to claim 1,
- wherein the color of the content corresponding to the predetermined direction is given to a portion, which is exposed when the display medium is observed in the predetermined direction, in the substrate.

4. The display medium according to claim 1,
- wherein each Voronoi face is formed by applying a predetermined thickness to a skeleton of the shielding member which includes a portion of a face in a Voronoi diagram.

5. A processing device that calculates a color given to a face of the partition of the display medium according to claim 1,
- wherein the face of the partition is virtually divided into a plurality of sub-cells, and
- wherein the processing device specifies a respective sub-cell visually recognized in each of the plurality of directions and determines a color given to the respective sub-cell such that a color formed by the color of each of the sub-cells visually recognized in each of the plurality of directions is approximately a color of a portion of the partition in a content corresponding to each of the plurality of directions.

6. A non-transitory computer-readable storage medium containing instructions which, when executed by a processor, cause the processor to calculate a color given to a face of the partition of the display medium according to claim 1,
- wherein the face of the partition is virtually divided into a plurality of sub-cells, and
- wherein the instructions further cause the processor to specify a respective sub-cell visually recognized in each of the plurality of directions and determine a color given to the respective sub-cell such that a color formed by the color of each of the sub-cells visually recognized in each of the plurality of directions is approximately a color of a portion of the partition in a content corresponding to each of the plurality of directions.

* * * * *